(12) United States Patent
Ha et al.

(10) Patent No.: US 7,944,444 B2
(45) Date of Patent: May 17, 2011

(54) 3D IMAGE PROCESSING APPARATUS AND METHOD

(75) Inventors: Tae-hyeun Ha, Suwon-si (KR); Sergey Shestak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1027 days.

(21) Appl. No.: 11/514,882

(22) Filed: Sep. 5, 2006

(65) Prior Publication Data
US 2007/0052794 A1    Mar. 8, 2007

(30) Foreign Application Priority Data

Sep. 3, 2005    (KR) .................... 10-2005-0082000

(51) Int. Cl.
*G06T 15/10*    (2006.01)
(52) U.S. Cl. ................. 345/427; 348/42; 353/6; 353/7; 359/462
(58) Field of Classification Search .......... None
See application file for complete search history.

(56) References Cited

U.S. PATENT DOCUMENTS

| | | | |
|---|---|---|---|
| 6,088,006 A * | 7/2000 | Tabata | 345/7 |
| 6,163,337 A | 12/2000 | Azuma et al. | |
| 6,724,325 B2 | 4/2004 | Fox | |
| 6,757,422 B1 * | 6/2004 | Suzuki et al. | 382/154 |
| 7,086,735 B1 * | 8/2006 | Provitola | 353/10 |
| 7,257,272 B2 * | 8/2007 | Blake et al. | 382/275 |
| 2003/0012425 A1 * | 1/2003 | Suzuki et al. | 382/154 |
| 2003/0204384 A1 * | 10/2003 | Owechko et al. | 703/1 |
| 2004/0057612 A1 | 3/2004 | Tabata | |
| 2005/0053274 A1 | 3/2005 | Mayer et al. | |
| 2006/0153289 A1 * | 7/2006 | Choi et al. | 375/240.01 |

FOREIGN PATENT DOCUMENTS

| | | |
|---|---|---|
| CN | 1643939 A | 7/2005 |
| EP | 1 551 189 A1 | 7/2005 |
| JP | 2002-125245 A | 4/2002 |
| JP | 2002-156227 A | 5/2002 |
| JP | 2003-006618 A | 1/2003 |
| KR | 10-0275542 B1 | 9/2000 |
| WO | 2005/020591 A1 | 3/2008 |

* cited by examiner

*Primary Examiner* — Said Broome
(74) *Attorney, Agent, or Firm* — Sughrue Mion, PLLC (57) ABSTRACT

A three-dimensional (3D) image processing apparatus and method are provided for use with a 3D image divided into a left-eye image and a right-eye image. The apparatus includes a disparity estimation unit estimating disparities between the left-eye image and the right-eye image; a horizontal movement determination unit determining a horizontal movement value for the left-eye image and the right-eye image using the estimated disparities; and a horizontal movement unit horizontally moving the left-eye image and the right-eye image based on the determined horizontal movement value. In the method and apparatus, a receiving end which receives and displays a 3D image can enhance 3D effects and reduce eye fatigue by adjusting the disparity of the 3D image.

23 Claims, 10 Drawing Sheets

3D IMAGE PROCESSING APPARATUS AND METHOD

This application claims the priority of Korean Patent Application No. 10-2005-0082000, filed on Sep. 3, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate processing a three-dimensional (3D) image, and more particularly, to an image processing apparatus and method for adjusting the disparity of an input 3D image and stably displaying the 3D image.

2. Description of the Related Art

Conventional three-dimensional (3D) displays display a 3D image by projecting images having different disparities to the left and right eyes of a user using a 2D flat display and tools such as a film-type micro-polarizer, a parallax barrier, and a lenticular lens. Such 3D displays may be classified into stereoscopic 3D displays and multiview 3D displays according to the number of views displayed thereon. Stereoscopic 3D displays display an image having two different views, and multiview 3D displays display an image having more than two views.

To produce a 3D image, a real image is filmed by a stereoscopic camera including two incident lenses or a multiview camera including a plurality of incident lenses. Alternatively, stereo or multiview image contents may be produced using computer graphics.

When a 3D image is produced using a 3D camera or when producing image contents using computer graphics, characteristics of human vision are taken into consideration. However, when a display environment is different from a production environment, for example, when a 3D image produced using a multiview camera is displayed on a stereoscopic 3D display or when displays of different sizes are used for producing and displaying a 3D image, conventional 3D displays cannot display a 3D image as intended.

SUMMARY OF THE INVENTION

Embodiments of the present invention provide an image processing method and apparatus which can be used to control convergence of an image acquired by a multiview camera to use the image for a three-dimensional (3D) stereo display.

Embodiments of the present invention also provide an image processing method and apparatus which can be used to enhance 3D effects and reduce eye fatigue by adjusting the disparity of an image at a receiving end which receives and displays a 3D image.

Embodiments of the present invention also provide an image processing method and apparatus which can be used to output a stable image by preventing jitter when a receiving end which receives and displays an image adjusts the disparity of the image and outputs the disparity-adjusted image.

Embodiments of the present invention also provide an image processing method and apparatus which can be used to scale and compensate an image cut in the process of disparity adjustment.

According to an aspect of an embodiment of the present invention, there is provided an image processing apparatus including: an image dividing unit receiving a 3D image and dividing the 3D image into a left-eye image and a right-eye image; a disparity estimation unit estimating disparities between the left-eye image and the right-eye image; a horizontal movement determination unit determining a horizontal movement value for the left-eye image and the right-eye image using the estimated disparities; and a horizontal movement unit horizontally moving the left-eye image and the right-eye image based on the determined horizontal movement value.

The horizontal movement determination unit may average the estimated disparities and determine the average disparity to be the horizontal movement value, and the horizontal movement unit may horizontally move the left-eye image and the right-eye image based on half the horizontal movement value multiplied by a predetermined proportionality constant.

The apparatus may further include a 3D stereo display unit displaying the disparity-adjusted left-eye image and right-eye image output from the horizontal movement unit.

According to another aspect of an embodiment of the present invention, there is provided an image processing apparatus including: an image dividing unit receiving a 3D image and dividing the 3D image into a left-eye image and a right-eye image; a disparity estimation unit estimating disparities between the left-eye image and the right-eye image; a horizontal movement determination unit determining a horizontal movement value for the left-eye image and the right-eye image using the estimated disparities; a filtering unit filtering the determined horizontal movement value; and a horizontal movement unit horizontally moving the left-eye image and the right-eye image based on the filtered horizontal movement value.

The disparity estimation unit may estimate disparities between middle portions of the left-eye image and the right-eye image. The filtering unit may low-pass-filter the horizontal movement value.

According to another aspect of an embodiment of the present invention, there is provided an image processing apparatus including: an image dividing unit receiving a 3D image and dividing the 3D image into a left-eye image and a right-eye image; a disparity estimation unit estimating disparities between the left-eye image and the right-eye image; a horizontal movement determination unit determining a horizontal movement value for the left-eye image and the right-eye image using the estimated disparities; a horizontal movement unit horizontally moving the left-eye image and the right-eye image based on the determined horizontal movement value; and a scaling unit vertically and horizontally scaling the disparity-adjusted left-eye image and right-eye image by a predetermined scale factor to compensate for portions of the disparity-adjusted left-eye image and right-eye image which are cut as a result of horizontal movement.

The scale factor may be $M/(M-D)$, where M is a horizontal size of the image and D is a value corresponding to half the horizontal movement value, and the scaling unit may remove a height of the scaled image which has become larger than that of an original image by scaling such that the scaled image becomes the same size as the original image.

The apparatus may further include a filtering unit between the horizontal movement determination unit and the horizontal movement unit, wherein the filtering unit low-pass-filters the horizontal movement value.

According to another aspect of an embodiment of the present invention, there is provided an image processing method including: receiving a 3D image and dividing the 3D image into a left-eye image and a right-eye image; estimating disparities between the left-eye image and the right-eye image; determining a horizontal movement value for the left-eye image and the right-eye image using the estimated disparities; and horizontally moving the left-eye image and the right-eye image based on the determined horizontal movement value.

According to another aspect of an embodiment of the present invention, there is provided an image processing method including: receiving a 3D image and dividing the 3D image into a left-eye image and a right-eye image; estimating disparities between the left-eye image and the right-eye image; determining a horizontal movement value for the left-eye image and the right-eye image using the estimated disparities; filtering the determined horizontal movement value; and horizontally moving the left-eye image and the right-eye image based on the filtered horizontal movement value.

According to another aspect of an embodiment of the present invention, there is provided an image processing method including: receiving a 3D image and dividing the 3D image into a left-eye image and a right-eye image; estimating disparities between the left-eye image and the right-eye image; determining a horizontal movement value for the left-eye image and the right-eye image using the estimated disparities; horizontally moving the left-eye image and the right-eye image based on the determined horizontal movement value; vertically and horizontally scaling the disparity-adjusted left-eye image and right-eye image by a predetermined scale factor to compensate for portions of the disparity-adjusted left-eye image and right-eye image which are cut as a result of the horizontal movement.

BRIEF DESCRIPTION OF THE DRAWINGS

The above and other features and advantages will become more apparent by describing in detail exemplary embodiments of the present invention with reference to the attached drawings in which.

DETAILED DESCRIPTION OF EMBODIMENTS OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

The structure of a camera which produces a real image will now be described with reference to FIGS. 1 and 3.

Figures 1A, 1B, 1C:
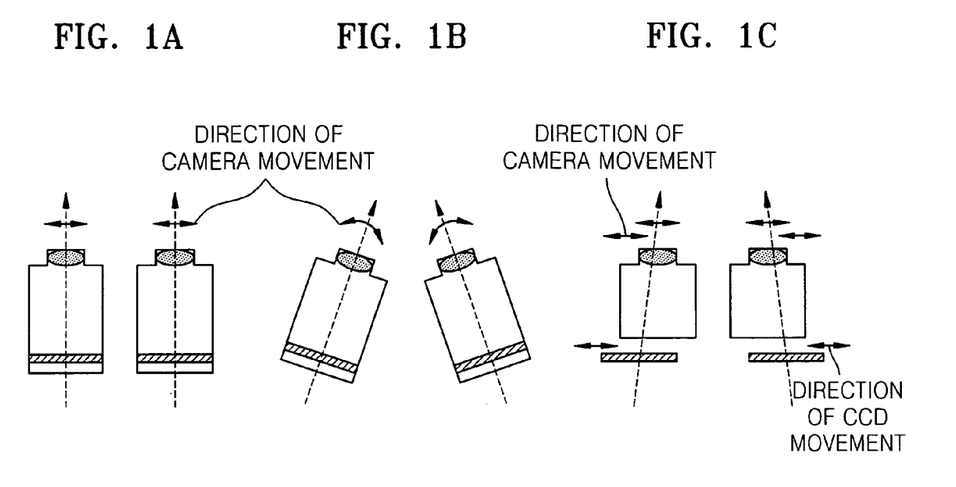
FIG. 1 illustrates types of stereoscopic cameras.

FIG. 1 illustrates various types of stereoscopic cameras. FIG. 1A illustrates a parallel stereoscopic camera. The alignment of the parallel stereoscopic camera is simple. However, since the parallel stereoscopic camera does not have a convergence function, it cannot take a photograph of an image taking into consideration characteristics of human vision. Thus, the filmed image cannot be used as a three-dimensional (3D) image. FIG. 1B illustrates a toed-in stereoscopic camera. The toed-in stereoscopic camera has a convergence function, and closely reflects characteristics of human vision. However, the toed-in stereoscopic camera has problems that are illustrated in FIG. 2.

Figure 2:
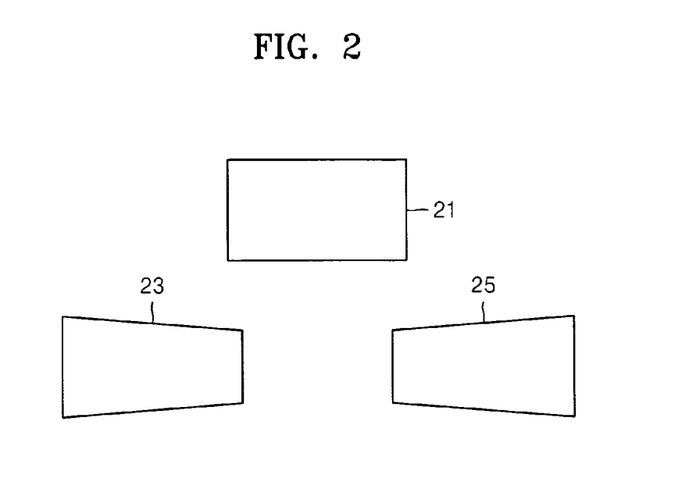
FIG. 2 illustrates problems created when a filming operation is performed using a toed-in stereoscopic camera.

FIG. 2 illustrates problems created when a filming operation is performed using the toed-in stereoscopic camera illustrated in FIG. 1B.

When a square subject 21 is positioned between the camera axes of the left and right cameras as illustrated in FIG. 2, images 23 and 25 respectively filmed by the left and right cameras are distorted as illustrated in FIG. 2. Such distortions of the images 23 and 25 cause eye fatigue FIG. 1C illustrates a hybrid stereoscopic camera aligned in such a way to prevent the drawbacks of the parallel stereoscopic camera and the toed-in stereoscopic camera respectively illustrated in FIGS. 1A and 1B. In the hybrid stereoscopic camera, lens units and charge-coupled device (CCD) units can be moved separately. Therefore, convergence can be controlled by adjusting positions of the CCD units and lenses.

Figure 3:
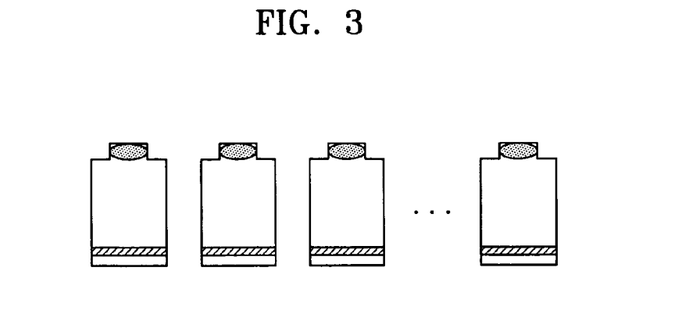
FIG. 3 illustrates the structure of a multiview camera according to an embodiment of the present invention.

FIG. 3 illustrates the structure of a multiview camera according to an embodiment of the present invention.

A conventional method of filming a multiview image uses the multiview camera structured as illustrated in FIG. 3. In an ongoing standardization process of motion picture experts group (MPEG) 3D audio video (3DAV), an image filmed by the multiview camera of FIG. 3 is used as a standard image. A stereoscopic camera can have the structure illustrated in FIG. 1C. However, in the case of multi-view video filming, it is realistically infeasible to control convergence for each image.

Figure 4:
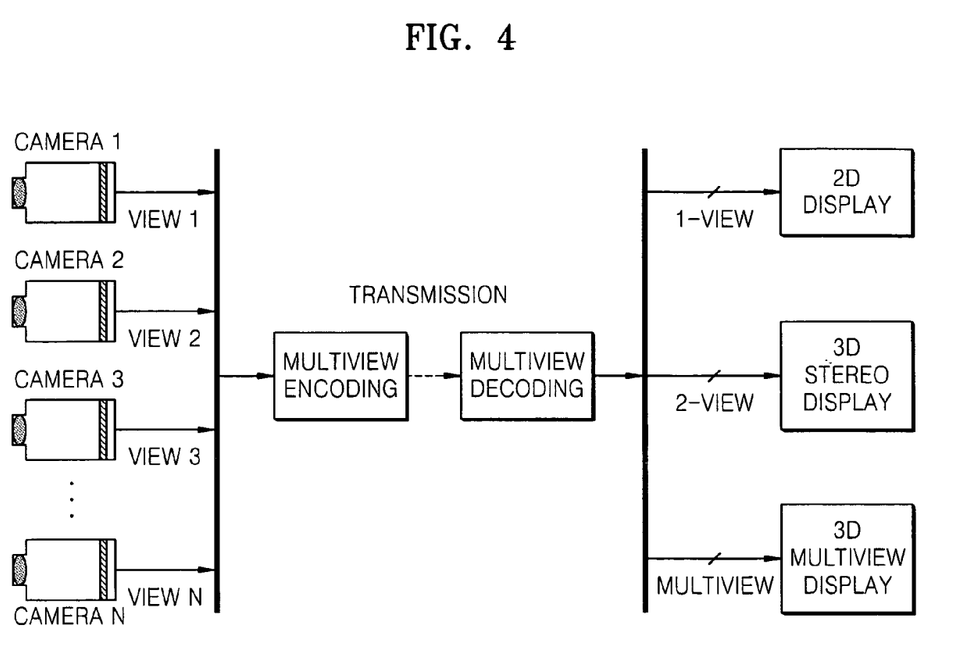
FIG. 4 illustrates an application of multiview video coding according to an embodiment of the present invention.

FIG. 4 illustrates an application of multiview video coding according to an embodiment of the present invention.

Referring to FIG. 4, an image output from a multi-view camera composed of N cameras is compressed and stored or transmitted in a multiview encoding process and then reconstructed in a multiview decoding process. The reconstructed image may be displayed according to application of a display device. That is, an image sequence of a view is displayed on a 2D display. For a 3D stereo display, two views are selected and used to display a 3D image on the 3D stereo display. For a 3D multiview display, at least two views are selected and used to display a 3D multiview image on the 3D multiview display. When two image sequences are used to display a 3D image on the 3D stereo display, the 3D stereo display has the same problems as the parallel stereoscopic camera illustrated in FIG. 1A. Therefore, an image acquired by a multiview camera must be properly processed to be displayed on the 3D stereo display.

FIG. 5 illustrates a left-eye image and a right-eye image filmed by a parallel multiview camera according to an embodiment of the present invention. When it is assumed that two views are selected from image sequences output from a parallel multiview camera and are used for a 3D stereo display, a phenomenon illustrated in FIG. 5 occurs.

Figure 5A:
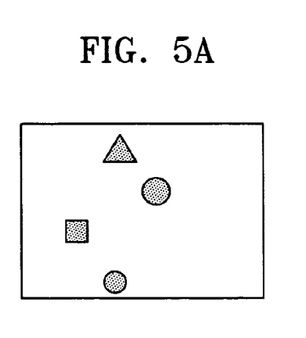
FIGS. 5A-5C illustrate a left-eye image and a right-eye image filmed by a multiview camera according to an embodiment of the present invention.
Figure 5B:
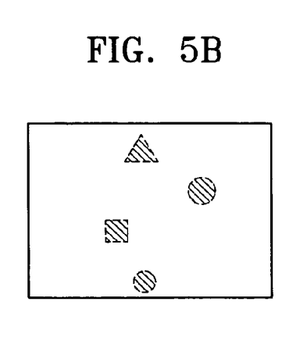
Figure 5C:
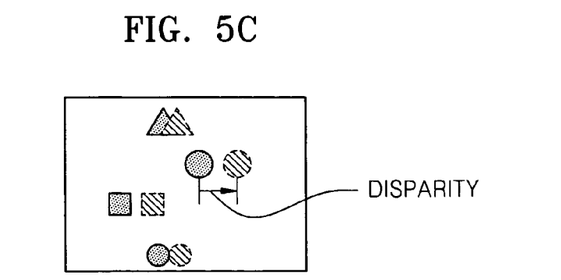

FIG. 5A illustrates the left-eye image, and FIG. 5B illustrates the right-eye image. FIG. 5C illustrates the left-eye image of FIG. 5A superimposed on the right-eye image of FIG. 5B in one plane to present a disparity between them. It is assumed that positive disparity exists when objects of the right-eye image exist on the right side of identical objects of the left-eye image. In this case, images of all objects within the superimposed image illustrated in FIG. 5C have positive disparities. In other words, it can be said that no converged point exists due to characteristics of the parallel camera or that converged points exist outside the screen.

When the superimposed image illustrated in FIG. 5C is displayed on a 3D stereo display, the images of all objects within the superimposed image appear to protrude from the screen. This kind of disparity, i.e., depth disparity, causes eye fatigue and reduces 3D effects.

Figure 6A:
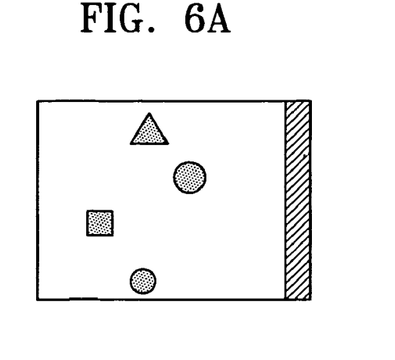
FIG. 6 illustrates a process of generating a stable stereo image by moving a left-eye image and a right-eye image of FIG. 5 to the left and right, respectively, according to an embodiment of the present invention.
Figure 6B:
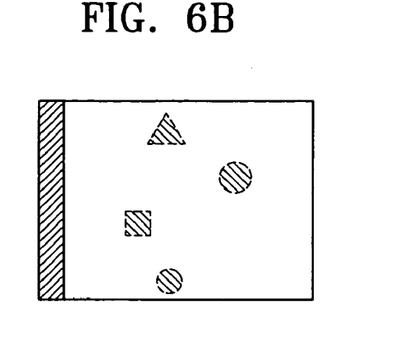
Figure 6C:
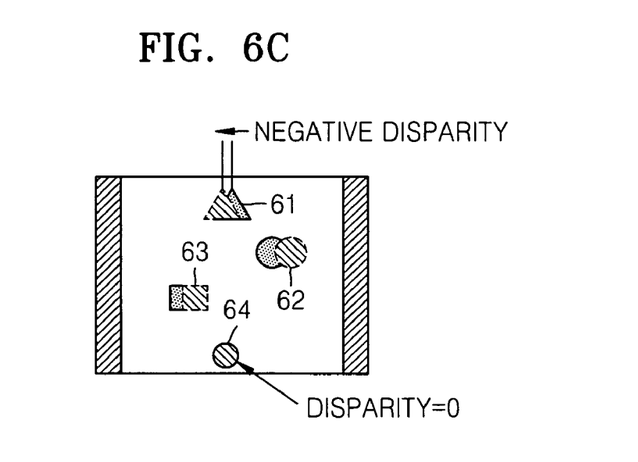

FIG. 6 illustrates a process of generating a stable stereo image by moving the left-eye image and the right-eye image of FIG. 5 to the left and right, respectively, according to an embodiment of the present invention. In other words, FIG. 6 illustrates a method of processing an image to provide a stable 3D image to users by adjusting disparities. FIG. 6A illustrates the right-eye image in FIG. 5A moved to the right, and FIG. 6B illustrates the left-eye image in FIG. 5B moved to the left. FIG. 6C illustrates the right-eye image in FIG. 6A synthesized with the left-eye image in FIG. 6B on a 3D stereo display according to an embodiment of the present invention.

Referring to FIG. 6C, the overall disparity of the synthesized image is smaller than that of the superimposed image illustrated FIG. 5C. Thus, images of some objects, for example, an image 61 of an object, have negative disparities. In other words, the image 61 has a negative depth and thus appears to be sunk into the screen. An image 64 is a convergence point having zero disparity and a depth equal to that of the screen. The disparities of images 62 and 63 are positive. Therefore, the images 62 and 63 appear to protrude from the screen.

When the right- and left-eye images are synthesized as illustrated in FIG. 6C, the images of the objects within the synthesized image have more various depths than those of the superimposed image illustrated in FIG. 5C. Therefore, a more stable and stereoscopic image can be provided to users. A method of determining a horizontal movement value by estimating disparities between input right- and left-eye images when the right- and left-eye images are horizontally moved at regular intervals will now be described with reference to FIGS. 7 and 8.

Figure 7:
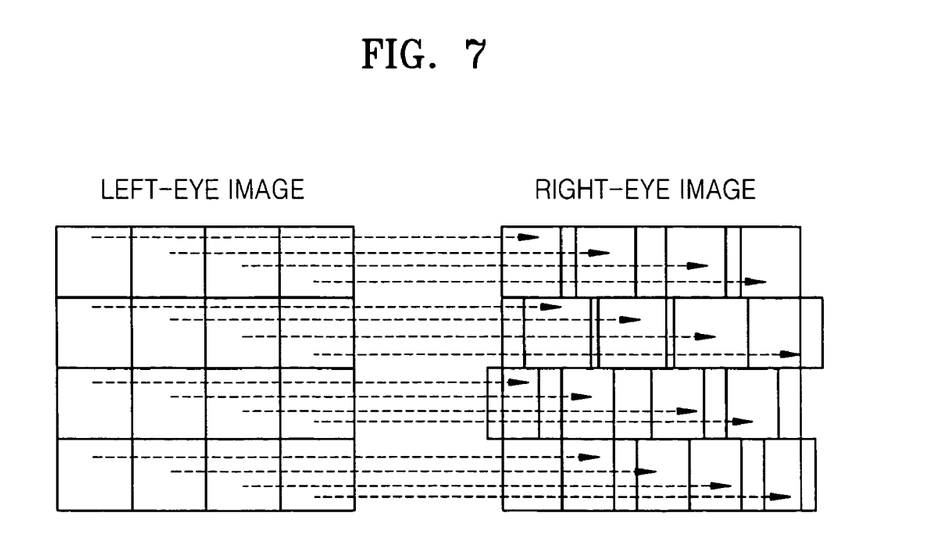
FIG. 7 illustrates block-based disparity estimation (DE) according to an embodiment of the present invention.

FIG. 7 illustrates block-based disparity estimation (DE) according to an embodiment of the present invention.

Referring to FIG. 7, a left-eye image is divided into N×N blocks of equal size. Blocks of a right-eye image which are most similar to corresponding blocks in the left-eye image are estimated using a sum of absolute difference (SAD) or a mean of absolute difference (MAD). In this case, a distance between a reference block and an estimated block is defined as a disparity vector (DV). Generally, a DV is assigned to each pixel in the reference image. However, to reduce the amount of computation required, it is assumed that the DVs of all pixels in a block are approximately the same in the block-based DE. The performing of DE on each pixel to obtain the DV for each pixel is called pixel-based DE.

In the method of determining a horizontal movement value according to an embodiment of the present invention, the DE is performed on the right-eye image and the left-eye image to obtain an average disparity between the right- and left-eye images. Then, the right-eye image and the left-eye image are each moved by half the average disparity. A horizontal movement value of the right- and left-eye images may be the average disparity multiplied by a proportionality constant which is determined according to characteristics of an image.

Figure 8:
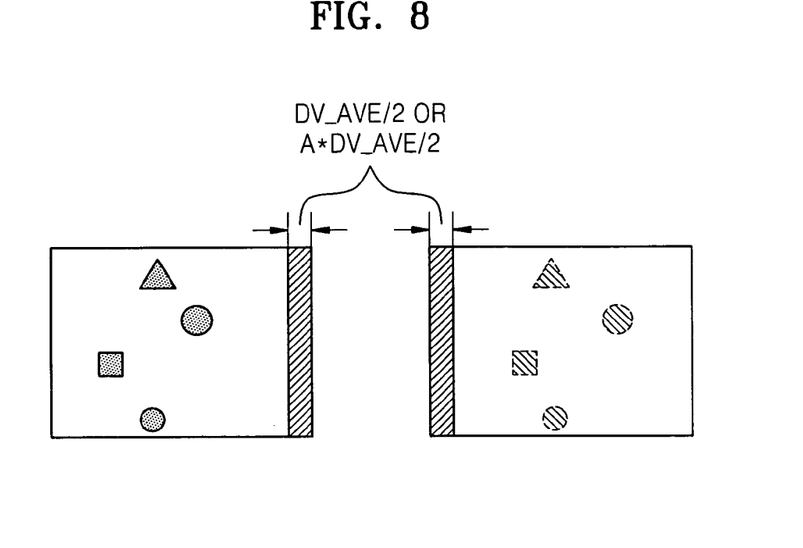
FIG. 8 illustrates horizontal movement of a right-eye image and a left-eye image according to a horizontal movement value determined by the DE of FIG. 7 according to an embodiment of the present invention.

FIG. 8 illustrates horizontal movement of a right-eye image and a left-eye image according to a horizontal movement value determined using the DE illustrated in FIG. 7.

In the block-based DE, when the disparity vector of a block is dv (x, y) (where x and y indicate a position of a block in a 2D plane) an average disparity (dv_ave) is an average of all dv (x, y). Referring to FIG. 8, the distances of the horizontal movements of the right- and left-eye images in FIG. 6 may be dv_ave/2 or dv_ave multiplied by a proportionality constant a, for example, a*dv_ave/2. In this case, the proportionality constant a may be experimentally determined. In FIG. 8, the left-eye image is horizontally moved to the right by dv_ave/2 or a*dv_ave/2, and the right-eye image is horizontally moved to the left by dv_ave/2 or a*dv_ave/2.

FIG. 9 illustrates a change in the display position of an image on a 3D display after the disparity of the image is adjusted by horizontally moving right- and left-eye images as illustrated in FIG. 8.

Figure 9A:
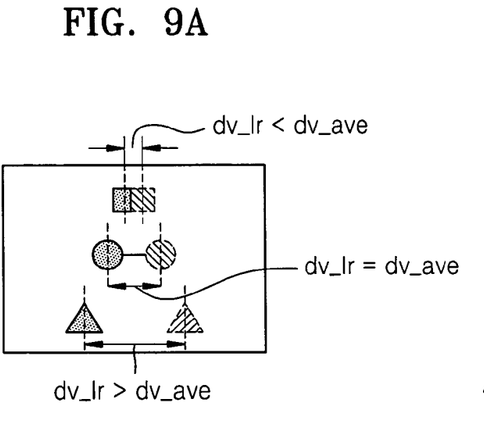
FIGS. 9A-9D illustrate a change in the display position of an image on a 3D display after the disparity of the image is adjusted by horizontally moving right- and left-eye images as illustrated in FIG. 8.
Figure 9B:
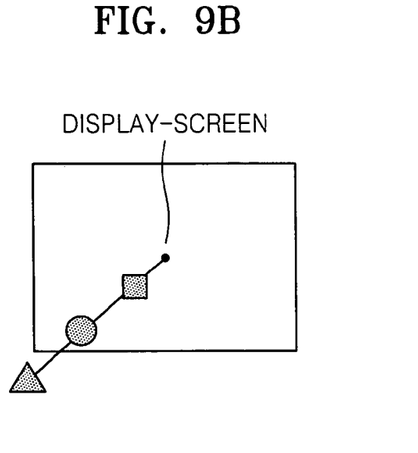

FIG. 9A illustrates a screen on which right- and left-eye images obtained using a general parallel multiview camera are superimposed. FIG. 9B illustrates a stereoscopic 3D display on which all objects in the superimposed image in FIG. 9A appear to protrude from the screen.

Figure 9C:
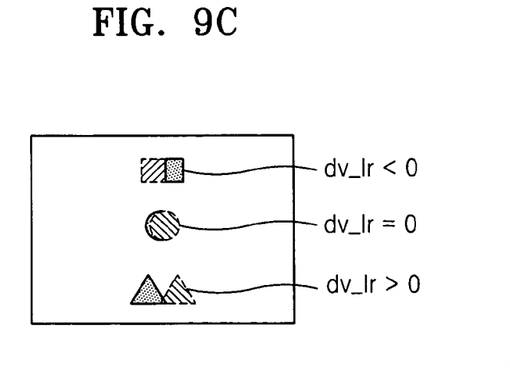
Figure 9D:
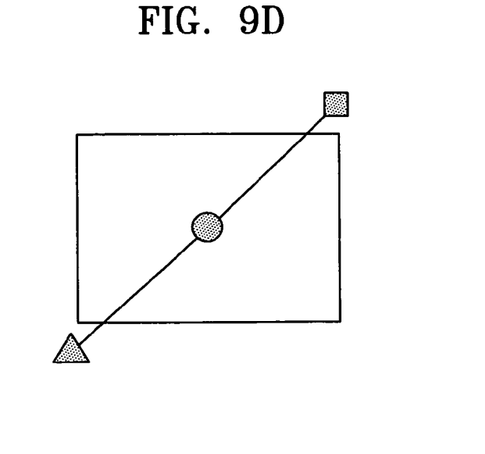

FIG. 9C illustrates the left and right-eye images respectively moved by dv_ave/2 and superimposed on the screen. FIG. 9D illustrates the superimposed image in FIG. 9C displayed on the stereoscopic 3D display. Referring FIGS. 9C and 9D, an object dv_lr<0 appears to be sunk into the screen, an object dv_lr=0 appears in the plane of the screen, and an object dv_lr>0 appears to protrude from the screen.

As described above, according to an embodiment of the present invention, when the disparity between the right- and left-eye images is adjusted based on dv_ave or de_ave*a (where a is a proportionality constant) and thus an image such as the superimposed image of FIG. 9C having an adjusted depth is generated, eye fatigue can be reduced while 3D effects are maintained.

Figure 10:
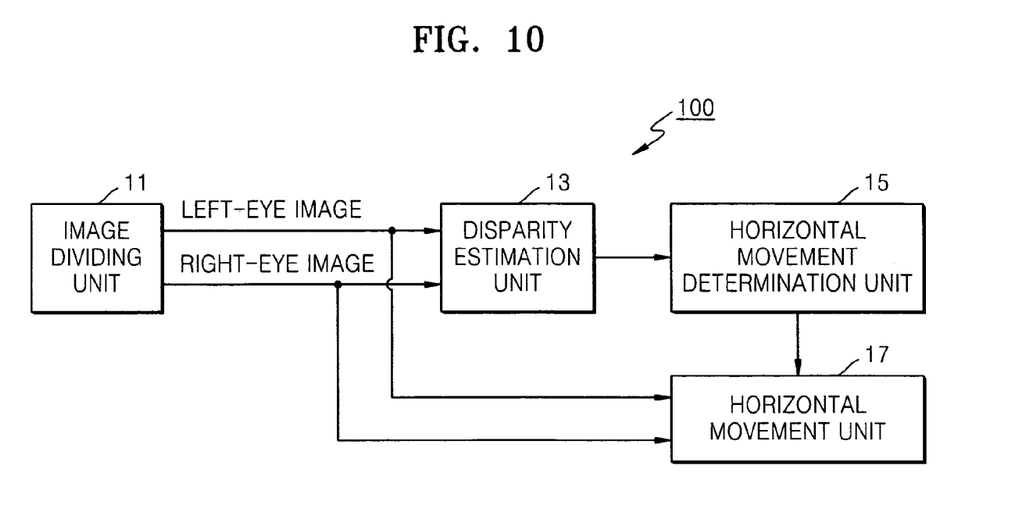
FIG. 10 is a block diagram of an image processing apparatus according to an embodiment of the present invention.

FIG. 10 is a block diagram of an image processing apparatus 100 according to an embodiment of the present invention. Referring to FIG. 10, the image processing apparatus 100 includes an image dividing unit 11, a disparity estimation unit 13, a horizontal movement determination unit 15, and a horizontal movement unit 17.

The image dividing unit 11 receives a 3D image and divides the 3D image into a right-eye image and a left-eye image. Then, the image dividing unit 11 transmits the right-eye image and the left-eye image to the disparity estimation unit 13 and the horizontal movement unit 17. The disparity estimation unit 13 estimates the disparities between the right-eye image and the left-eye image. In this case, the block-based disparity estimation described above or other methods may be used.

The horizontal movement determination unit 15 receives the estimated disparities from the disparity estimation unit 13 and determines a horizontal movement value for the right- and left-eye images. In detail, the horizontal movement determination unit 15 averages the estimated disparities and determines an average disparity as the horizontal movement value. The horizontal movement unit 17 moves the right-eye image and the left-eye image by a value obtained after a value corresponding to half the horizontal movement value is multiplied by a predetermined proportionality constant. When the predetermined proportionality constant is one, the right- and left-eye images are horizontally moved by a value corresponding to half the average disparity between the right- and left-eye images.

The horizontal movement unit 17 moves the left-eye image to the right and the right-eye image to the left based on the value corresponding to half the determined horizontal movement value multiplied by the predetermined proportionality constant and outputs the disparity-adjusted left and right-eye images. Although not shown, the disparity adjustment apparatus 100 may include a 3D stereo display unit to display the disparity-adjusted left- and right-eye images which are output from the horizontal movement unit 17.

Figure 11:
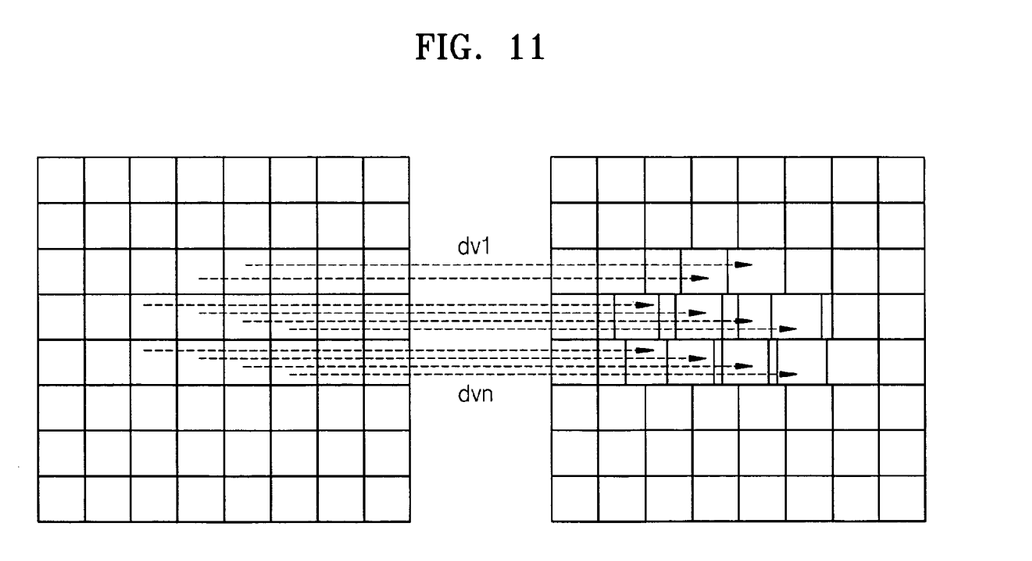
FIG. 11 illustrates a process of performing disparity estimation on middle portions of right- and left-eye images according to an embodiment of the present invention.

FIG. 11 illustrates a process of performing disparity estimation on middle portions of right- and left-eye images according to an embodiment of the present invention.

A method of calculating the average disparity dv_ave for disparity adjustment according to an embodiment of the present invention will now be described with reference to FIG. 11. When a disparity vector at a certain point is excessively greater than at other points of the image, the average disparity dv_ave, which is based on the disparity vectors, may be overly influenced by the point with the excessively large disparity vector. In particular, edge portions of the right-eye image identical to those of the left-eye image may not be found during the DE. Hence, when edge portions are used for the DE, an appropriate average disparity dv_ave cannot be obtained.

In this regard, referring to FIG. 11, the DE is performed on a middle area, which results in few estimation errors overall. The size of the area on which the DE is performed may be experimentally determined. However, after an appropriate average disparity dv_ave is determined, if the average disparity dv_ave is changed for each image of an image sequence, a jitter phenomenon occurs in image sequences of a disparity-adjusted image. Therefore, when a viewer views the image sequences, the viewer may feel as if the image sequences are trembling horizontally. To avoid such a jitter phenomenon, the average disparity dv_ave must be maintained stable.

Therefore, the image processing apparatus 100 filters the average disparity dv_ave to prevent the excessive adjustment of disparities between right- and left-eye images following an abrupt change in the average disparity dv_ave. In this case, a low pass filter (LPF) may be used to filter the horizontal movement value, which is based on the average disparity dv_ave.

Figure 12:
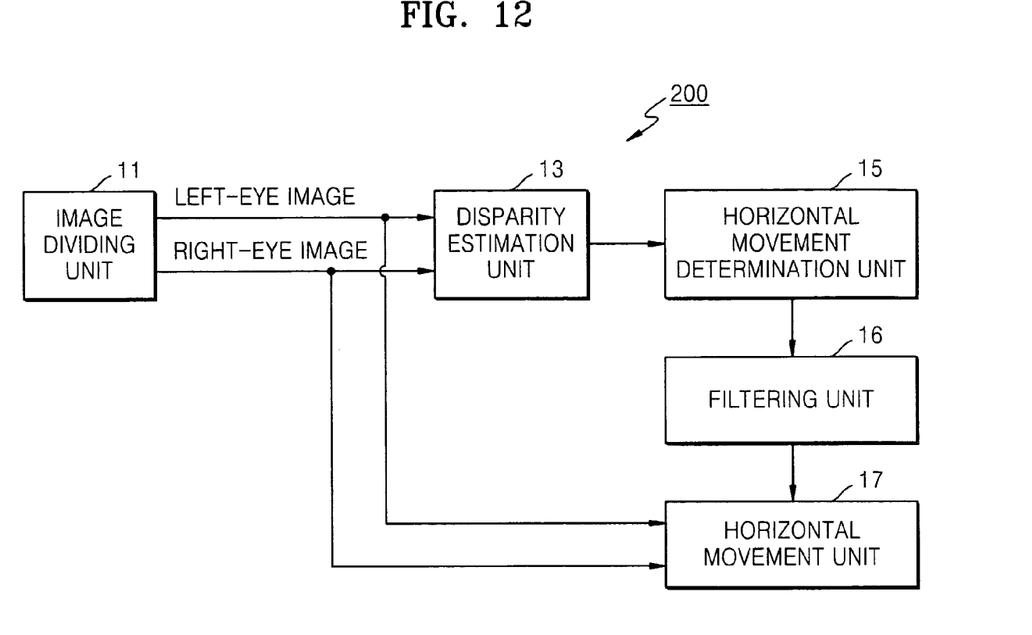
FIG. 12 illustrates an image processing apparatus according to another embodiment of the present invention.

FIG. 12 illustrates an image processing apparatus 200 according to another embodiment of the present invention.

Referring to FIG. 12, the image processing apparatus 200 includes an image dividing unit 11, a disparity estimation unit 13, a horizontal movement determination unit 15, a filtering unit 16, and a horizontal movement unit 17. The image processing apparatus 200 of FIG. 12 has a jitter prevention function in addition to the functions provided by the image processing apparatus 100 of FIG. 10.

The image dividing unit 11 receives a 3D image and divides the 3D image into a right-eye image and a left-eye image. Then, the image dividing unit 11 transmits the right-eye image and the left-eye image to the disparity estimation unit 13 and the horizontal movement unit 17. The disparity estimation unit 13 estimates disparities between the right-eye image and the left-eye image. As described with reference to FIG. 11, the disparity estimation unit 13 may perform the DE on a middle area of each of the right- and left-eye images such that a relatively excessive disparity between the right-eye image and the left-eye image is not estimated.

The horizontal movement determination unit 15 receives the estimated disparities from the disparity estimation unit 13 and determines a horizontal movement value for the right- and left-eye images. The filtering unit 16 filters the determined horizontal movement value to prevent excessive changes in the horizontal movement value from 3D image to 3D image. The filtering unit 16 filters the horizontal movement value using a LPF.

The horizontal movement unit 17, which receives the right-eye image and the left-eye image from the image dividing unit 11, horizontally moves the right-eye image and the left-eye image by the filtered horizontal movement value and outputs the disparity-adjusted left and right-eye images. Although not shown, the image processing apparatus 200 may include a 3D stereo display unit to display the disparity-adjusted left- and right-eye images which are output from the horizontal movement unit 17.

FIG. 13 illustrates a process of compensating an image cut in the process of disparity adjustment by scaling the image according to an embodiment of the present invention.

When the image processing apparatus of FIG. 10 or 12 is used, eye fatigue can be reduced, and 3D effects can be enhanced. However, when the disparities between a right-eye image and a left-eye image are adjusted as illustrated in FIGS. 6 and 8, a right edge portion of the left-eye image and a left edge portion of the right-eye image with widths of dv_ave/2 or a*dv_ave/2 are lost. A method of scaling and reconstructing the lost portions of the image will now be described with reference to FIG. 13.

Figure 13A:
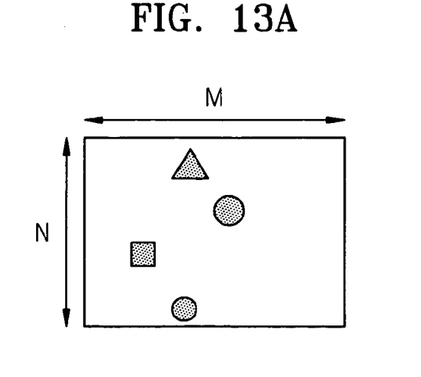
FIGS. 13A-13D illustrate a process of compensating an image cut in the process of disparity adjustment by scaling the image according to an embodiment of the present invention.
Figure 13B:
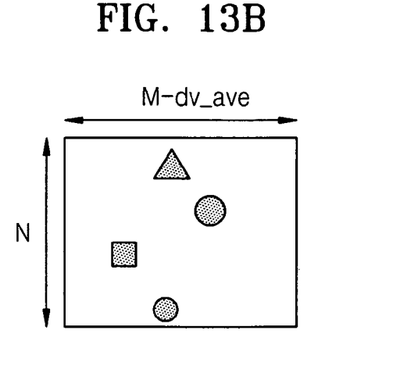

FIG. 13A illustrates an original image, and FIG. 13B illustrates an image obtained after a right edge portion of the original image with a width of dv_ave is cut for disparity adjustment.

Figure 13C:
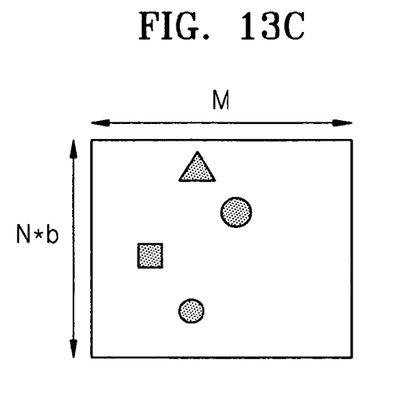

To compensate the image illustrated in FIG. 13B, the image as a whole is scaled by a predetermined factor to its original size. FIG. 13C illustrates an image obtained after the image illustrated in FIG. 13B is scaled. When it is assumed that a proportionality constant for scaling is b, the proportionality constant may be given by $$b = M/(M - dv\_ave) \tag{1}$$

Figure 13D:
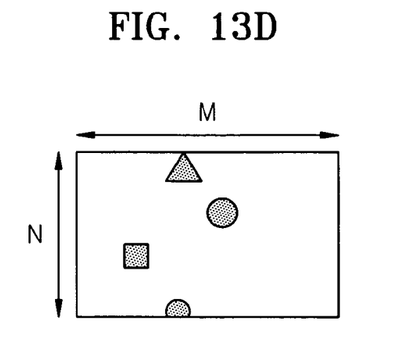

Referring to FIG. 13C, the scaled image has a greater height than the original image. Therefore, vertical edge portions of the scaled image are cut to create a reconstructed image illustrated in FIG. 13D. The reconstructed image illustrated in FIG. 13D is created after vertical edge portions of the scaled image illustrated in FIG. 13C with a total width of N(b−1) are cut. In this way, an image cut for disparity adjustment can be reconstructed.

Figure 14:
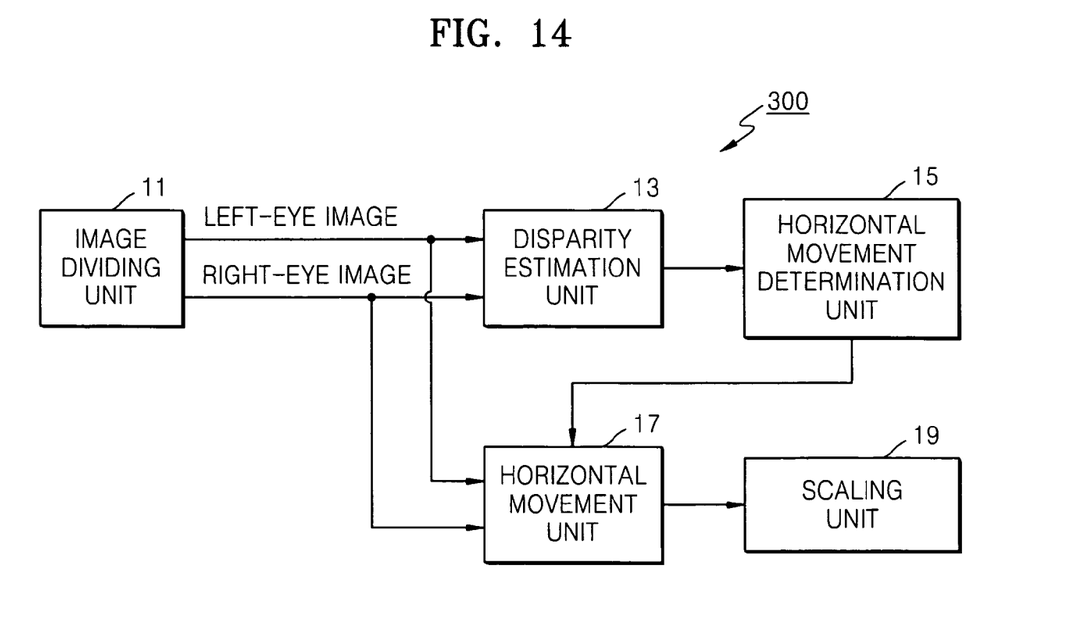
FIG. 14 illustrates an image processing apparatus according to another embodiment of the present invention.

FIG. 14 illustrates an image processing apparatus 300 according to another embodiment of the present invention.

Referring to FIG. 14, the image processing apparatus 300 includes an image dividing unit 11, a disparity estimation unit 13, a horizontal movement determination unit 15, a horizontal movement unit 17, and a scaling unit 19. The image processing apparatus 300 of FIG. 14 has a scaling function in addition to the functions provided by the image processing apparatus 200 of FIG. 10.

The image dividing unit 11 receives a 3D image and divides the 3D image into a right-eye image and a left-eye image. Then, the image dividing unit 11 transmits the right-eye image and the left-eye image to the disparity estimation unit 13 and the horizontal movement unit 17. The disparity estimation unit 13 estimates disparities between the right-eye image and the left-eye image. The disparity estimation unit 13 may perform DE on a middle area of each of the right- and left-eye images so that an appropriate horizontal movement value can be determined.

The horizontal movement determination unit 15 receives the estimated disparities from the disparity estimation unit 13 and determines a horizontal movement value for the right- and left-eye images. The horizontal movement unit 17, which receives the right-eye image and the left-eye image from the image dividing unit 11, horizontally moves the right-eye image and the left-eye image by the horizontal movement value determined by the horizontal movement determination unit 15 and outputs the disparity-adjusted right- and left-eye images.

The scaling unit 19, which receives the disparity-adjusted right- and left-eye images from the horizontal movement unit 17, vertically and horizontally scales the received disparity-adjusted right- and left-eye images by a predetermined scale factor, and compensates for portions of the right- and left-eye images that are cut after the right- and left-eye images are horizontally moved. In detail, the scaling unit 19 cuts the scaled right- and left-eye images, which have greater heights than the original right- and left-eye images, to their original sizes, and outputs the resultant right- and left-eye images. In addition, the image processing apparatus 300 may include a filtering unit 16 between the horizontal movement determination unit 15 and the horizontal movement unit 17 as illustrated in FIG. 12 to provide a jitter prevention function.

Although not shown in FIG. 14, the image processing apparatus 300 may include a 3D stereo display unit to display the disparity-adjusted left and right-eye images which are output from the scaling unit 19.

Figure 15:
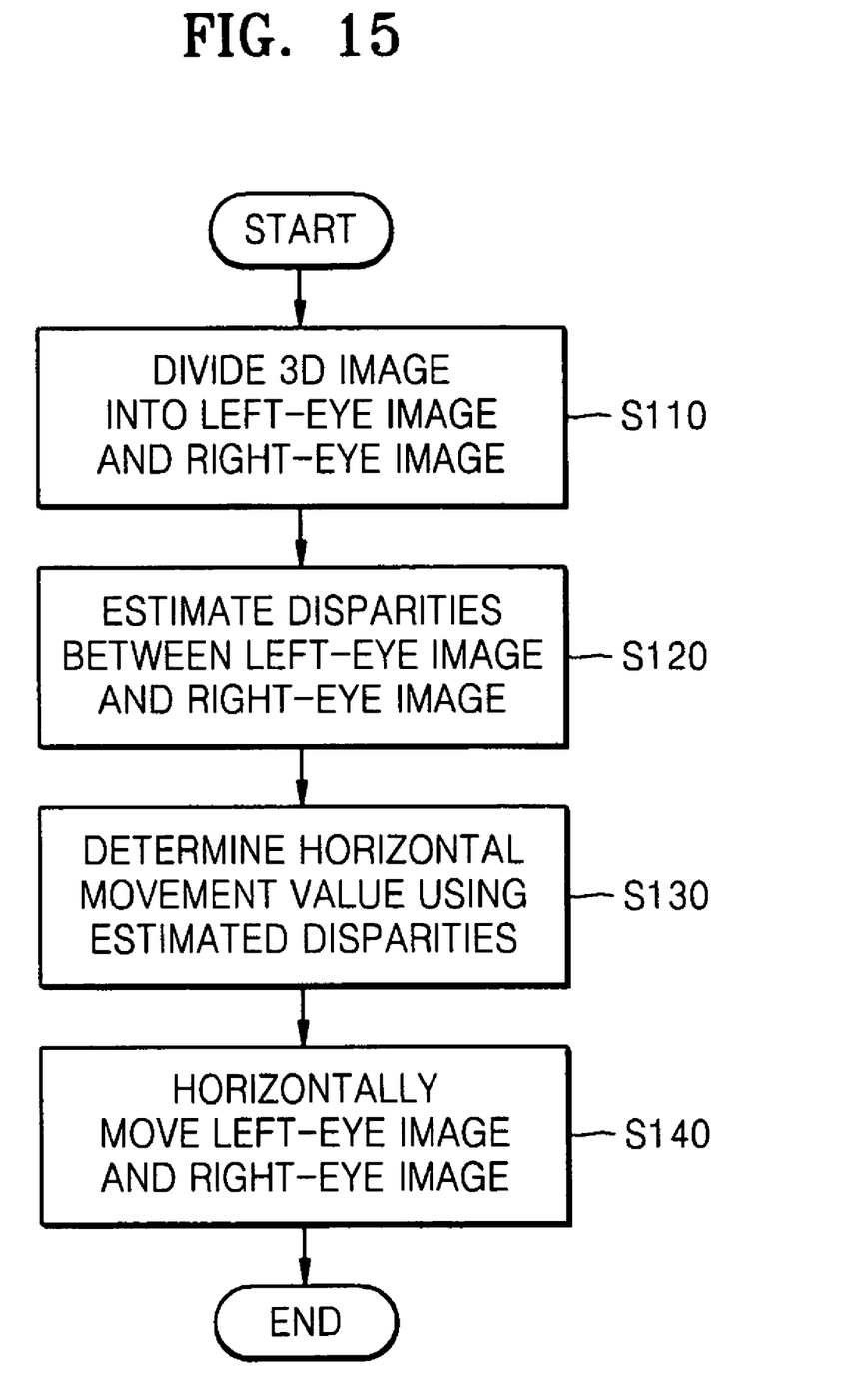
FIG. 15 is a flowchart illustrating an image processing method according to an embodiment of the present invention.

FIG. 15 is a flowchart illustrating an image processing method according to an embodiment of the present invention.

To adjust the disparity of a 3D image, the 3D image is received and divided into a right-eye image and a left-eye image (S110). Disparities between the right-eye image and the left-eye image are estimated (S120). A horizontal movement value for the right-eye image and the left-eye image is determined based on the estimated disparities (S130). The horizontal movement value may be determined by averaging the estimated disparities.

The right-eye image and the left-eye image are horizontally moved based on the determined horizontal movement value (S140). The disparity-adjusted right- and left-eye images are output and displayed on a 3D stereo display.

Figure 16:
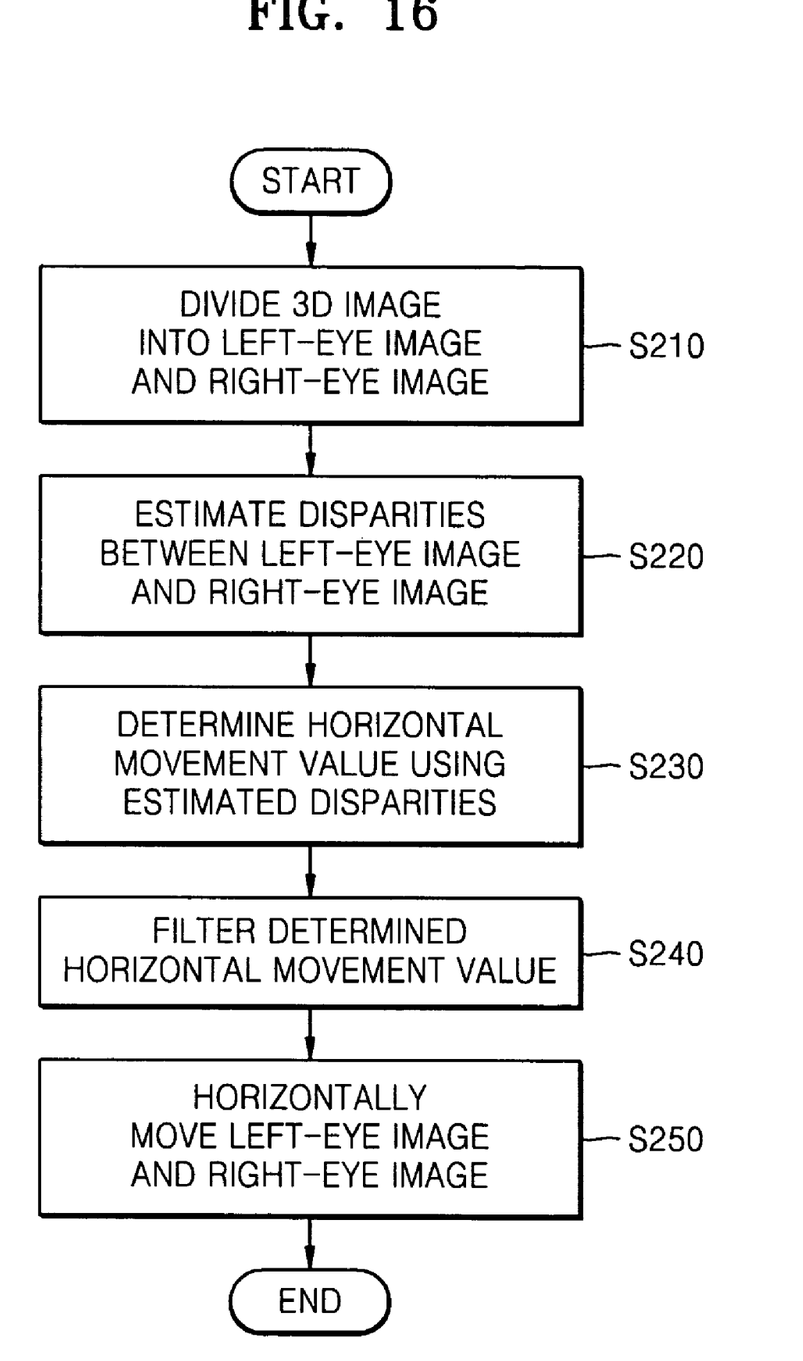
FIG. 16 is a flowchart illustrating an image processing method according to another embodiment of the present invention.

FIG. 16 is a flowchart illustrating an image processing method according to another embodiment of the present invention.

A 3D image is received and divided into a right-eye image and a left-eye image (S210). Disparities between the right-eye image and the left-eye image are estimated (S220). In an embodiment of the present invention, operation S220 may include estimating disparities between middle portions of the right- and left-eye images to prevent abrupt changes in a horizontal movement value to be calculated in a subsequent operation.

The horizontal movement value for the right-eye image and the left-eye image is determined based on the estimated disparities (S230). The horizontal movement value is filtered to prevent excessive changes in the horizontal movement value to have been determined successively (S240). The horizontal movement value may be filtered using a LPF. The right- and left-eye images are horizontally moved based on the filtered horizontal movement value (S250). Then, the disparity-adjusted right- and left-eye images are output and displayed on a 3D stereo display.

Figure 17:
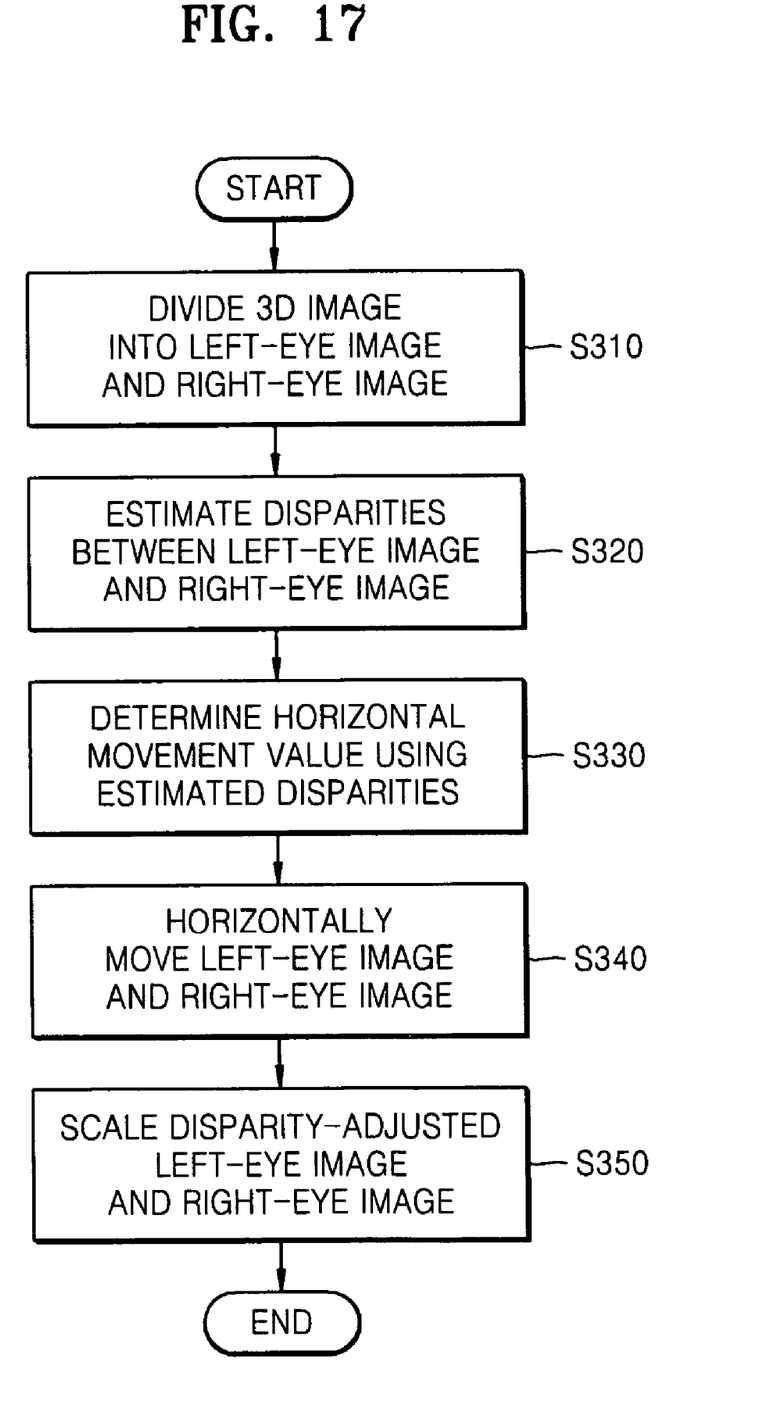
FIG. 17 is a flowchart illustrating an image processing method according to yet another embodiment of the present invention.

FIG. 17 is a flowchart illustrating an image processing method according to another embodiment of the present invention.

A 3D image is received and divided into a right-eye image and a left-eye image (S 310). Disparities between the right-eye image and the left-eye image are estimated (S 320). A horizontal movement value for the right-eye image and the left-eye image is determined based on the estimated disparities (S 330). Operation S330 may further include filtering the horizontal movement value to prevent excessive changes in the horizontal movement value. In this case, the horizontal movement value may be filtered using a LPF.

The right- and left-eye images are horizontally moved based on the horizontal movement value, and the disparity-adjusted right- and left-eye images are output (S 340).

The disparity-adjusted right- and left-eye images are vertically and horizontally scaled by a predetermined scaling factor, and portions of the right- and left-eye images, which are cut after the right- and left-eye images are horizontally moved, are compensated for. Furthermore, the scaled right- and left-eye images, which have greater heights than the original right- and left-eye images, are vertically cut to their original sizes (S350). The resultant right- and left-eye images are displayed on a 3D stereo display.

The image processing method and apparatus according to the present invention can be used to control convergence of an image acquired by a multiview camera or a parallel stereoscopic camera to use the image for a 3D stereo display.

The image processing method and apparatus according to the present invention can be used to enhance 3D effects and reduce eye fatigue by adjusting the disparity of an image at a receiving end which receives and displays a 3D image.

The image processing method and apparatus according to the present invention can be used to output a stable image by preventing jitter when a receiving end, which receives and displays an image, adjusts the disparity of the image and outputs the disparity-adjusted image.

The image processing method and apparatus according to the present invention can be used to scale and compensate an image cut in the process of disparity adjustment.

The present invention can also be implemented as computer-readable code on a computer-readable recording medium. The computer-readable recording medium can be any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image processing apparatus for use with a three-dimensional (3D) image divided into a left-eye image and a right-eye image in a display device comprising a processor, comprising:
   a disparity estimation unit estimating disparities between the left-eye image and the right-eye image;
   a movement determination unit determining a movement value for the left-eye image and the right-eye image using the estimated disparities; and
   a movement unit translating the left-eye image and the right-eye image based on the determined movement value,
   wherein the movement value is a value for a horizontal movement and the movement unit translates the left-eye image and the right-eye image horizontally based on the determined movement value, and
   wherein the movement determination unit averages the estimated disparities and determines the average disparity to be the movement value, and the movement unit moves the left-eye image and the right-eye image horizontally based on half the movement value multiplied by a predetermined proportionality constant.

2. The apparatus of claim 1, further comprising a 3D stereo display unit displaying the translated left-eye image and translated right-eye image output from the movement unit.

3. An image processing apparatus for use with a three-dimensional (3D) image divided into a left-eye image and a right-eye image, comprising:
   a disparity estimation unit estimating disparities between the left-eye image and the right-eye image;
   a movement determination unit determining a movement value for the left-eye image and the right-eye image using the estimated disparities;
   a filtering unit filtering the determined movement value; and
   a movement unit translating the left-eye image and the right-eye image based on the filtered movement value,
   wherein the movement value is a value for a horizontal movement and the movement unit translates the left-eye image and the right-eye image horizontally based on the filtered movement value, and
   wherein the movement determination unit averages the estimated disparities and determines the average disparity to be the movement value, and the movement unit moves the left-eye image and the right-eye image based on half the movement value multiplied by a predetermined proportionality constant.

4. The apparatus of claim 3, wherein the disparity estimation unit estimates disparities between middle portions of the left-eye image and the right-eye image.

5. The apparatus of claim 3, wherein the filtering unit low-pass-filters the movement value.

6. The apparatus of claim 3, further comprising a 3D stereo display unit displaying the translated left-eye image and translated right-eye image output from the movement unit.

7. An image processing apparatus for use with a three-dimensional (3D) image divided into a left-eye image and a right-eye image, comprising:
   a disparity estimation unit estimating disparities between the left-eye image and the right-eye image;
   a movement determination unit determining a movement value for the left-eye image and the right-eye image using the estimated disparities;
   a movement unit translating the left-eye image and the right-eye image based on the determined movement value; and
   a scaling unit scaling the translated left-eye image and translated right-eye image by a predetermined scale factor to compensate for portions of the translated left-eye image and translated right-eye image which are cut as a result of movement,
   wherein the movement value is a value for a horizontal movement and the movement unit moves the left-eye image and the right-eye image horizontally based on the determined movement value and the scaling unit vertically and horizontally scales the translated left-eye image and translated right-eye image, and
   wherein the movement determination unit averages the estimated disparities and determines the average disparity to be the movement value, and the movement unit horizontally moves the left-eye image and the right-eye image based on half the movement value multiplied by a predetermined proportionality constant.

8. The apparatus of claim 7, wherein the disparity estimation unit estimates disparities between middle portions of the left-eye image and the right-eye image.

9. An image processing apparatus for use with a three-dimensional (3D) image divided into a left-eye image and a right-eye image, comprising:
   a disparity estimation unit estimating disparities between the left-eye image and the right-eye image;
   a movement determination unit determining a movement value for the left-eye image and the right-eye image using the estimated disparities;
   a movement unit translating the left-eye image and the right-eye image based on the determined movement value; and
   a scaling unit scaling the translated left-eye image and translated right-eye image by a predetermined scale factor to compensate for portions of the translated left-eye image and translated right-eye image which are cut as a result of movement,
   wherein the movement value is a value for a horizontal movement and the movement unit moves the left-eye image and the right-eye image horizontally based on the determined movement value and the scaling unit vertically and horizontally scales the translated left-eye image and translated right-eye image, and
   wherein the scale factor is $M/(M-D)$, where M is a horizontal size of the image and D is a value corresponding to half the movement value, and the scaling unit removes a height of the scaled image which has become larger than that of an original image by scaling such that the scaled image becomes the same size as the original image.

10. The apparatus of claim 7, further comprising a filtering unit coupled to the movement determination unit and the movement unit, wherein the filtering unit low-pass-filters the movement value.

11. The apparatus of claim 7, further comprising a 3D stereo display unit displaying the scaled left-eye image and scaled right-eye image output from the movement unit.

12. An image processing method for use with a three-dimensional (3D) image divided into a left-eye image and a right-eye image in a display device comprising a processor, comprising:
estimating, using the processor, disparities between the left-eye image and the right-eye image;
determining a movement value for the left-eye image and the right-eye image using the estimated disparities; and
translating the left-eye image and the right-eye image based on the determined movement value,
wherein the movement value is a value for a horizontal movement and the left-eye image and the right-eye image are translated horizontally based on the determined movement value, and
wherein the determination of the movement value comprises averaging the estimated disparities and determining an average disparity to be the movement value, and the horizontal movement of the left-eye image and the right-eye image comprises translating the left-eye image and the right-eye image based on a half the movement value multiplied by a predetermined proportionality constant.

13. The method of claim 12, further comprising displaying the translated left-eye image and translated right-eye image on a 3D stereo display.

14. An image processing method for use with a three-dimensional (3D) image divided into a left-eye image and a right-eye image in a display device comprising a processor, comprising:
estimating, using the processor, disparities between the left-eye image and the right-eye image;
determining a movement value for the left-eye image and the right-eye image using the estimated disparities;
filtering the determined movement value; and
translating the left-eye image and the right-eye image based on the filtered movement value,
wherein the movement value is a value for a horizontal movement and the left-eye image and the right-eye image are translated horizontally based on the filtered movement value, and
wherein the determination of the movement value comprises averaging the estimated disparities and determining an average disparity to be the movement value, and the horizontal movement of the left-eye image and the right-eye image comprises moving the left-eye image and the right-eye image based on half the movement value multiplied by a predetermined proportionality constant.

15. The method of claim 14, wherein the estimation of the disparities comprises estimating disparities between middle portions of the left-eye image and the right-eye image.

16. The method of claim 14, wherein the filtering of the movement value comprises low-pass-filtering the movement value.

17. The method of claim 14, further comprising displaying the translated left-eye image and translated right-eye image on a 3D stereo display.

18. An image processing method for use with a three-dimensional (3D) image divided into a left-eye image and a right-eye image in a display device comprising a processor, comprising:
estimating, using the processor, disparities between the left-eye image and the right-eye image;
determining a movement value for the left-eye image and the right-eye image using the estimated disparities;
translating the left-eye image and the right-eye image based on the determined movement value; and
scaling the translated left-eye image and right-eye image by a predetermined scale factor to compensate for portions of the translated left-eye image and right-eye image which are cut as a result of the movement,
wherein the movement value is a value for a horizontal movement and the left-eye image and the right-eye image are moved horizontally based on the determined movement value and the scaling vertically and horizontally scales the translated left-eye image and translated right-eye image, and
wherein the determination of the movement value comprises averaging the estimated disparities and determining an average disparity to be the movement value, and the horizontal movement of the left-eye image and the right-eye image comprises translating the left-eye image and the right-eye image based on half the movement value multiplied by a predetermined proportionality constant.

19. The method of claim 18, wherein the estimation of the disparities comprises estimating disparities between middle portions of the left-eye image and the right-eye image.

20. An image processing method for use with a three-dimensional (3D) image divided into a left-eye image and a right-eye image in a display device comprising a processor, comprising:
estimating, using the processor, disparities between the left-eye image and the right-eye image;
determining a movement value for the left-eye image and the right-eye image using the estimated disparities;
translating the left-eye image and the right-eye image based on the determined movement value; and
scaling the translated left-eye image and right-eye image by a predetermined scale factor to compensate for portions of the translated left-eye image and right-eye image which are cut as a result of the movement,
wherein the movement value is a value for a horizontal movement and the left-eye image and the right-eye image are moved horizontally based on the determined movement value and the scaling vertically and horizontally scales the translated left-eye image and translated right-eye image, and
wherein the scale factor is $M/(M-D)$, where M is a horizontal size of the 3D image and D is half the movement value, and the compensation of the images of the portions comprises:
scaling the translated left-eye image and translated right-eye image by the scale factor; and
removing a height of the scaled image which has become larger than that of an original image by scaling such that the scaled image becomes the same size as the original image left-eye image and right-eye images.

21. The method of claim 18, further comprising low-pass-filtering the movement value before the horizontal movement of the left-eye image and the right-eye image.

22. The method of claim 18, further comprising displaying the scaled left-eye image and scaled right-eye image on a 3D stereo display.

23. A non-transient computer-readable recording medium on which a program is recorded, wherein the program when executed by a computer performs the method of claim 12.

* * * * *